United States Patent
Morita et al.

(10) Patent No.: US 10,178,260 B2
(45) Date of Patent: *Jan. 8, 2019

(54) IMAGE FORMING APPARATUS AND STORAGE MEDIUM INCLUDING AN APPLICATION HAVING A CORE LOGIC PORTION AND A USER INTERFACE FRAME PORTION

(71) Applicant: FUJI XEROX CO., LTD., Tokyo (JP)

(72) Inventors: Masao Morita, Kanagawa (JP); Masanori Satake, Kanagawa (JP); Tadao Michimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,421

(22) Filed: Mar. 6, 2017

(65) Prior Publication Data

US 2018/0091687 A1 Mar. 29, 2018

(30) Foreign Application Priority Data

Sep. 26, 2016 (JP) .................. 2016-187293

(51) Int. Cl.
*G06F 3/12* (2006.01)
*H04N 1/00* (2006.01)
*G06F 9/451* (2018.01)
*G05B 15/02* (2006.01)
*G06K 15/00* (2006.01)

(52) U.S. Cl.
CPC ......... *H04N 1/00941* (2013.01); *G05B 15/02* (2013.01); *G06F 9/451* (2018.02); *H04N 1/00408* (2013.01); *H04N 1/00474* (2013.01); *H04N 2201/0094* (2013.01)

(58) Field of Classification Search
CPC .............. G06F 9/4443; H04N 1/00432; H04N 1/00472; H04N 1/00474; H04N 1/00941; H04N 1/00408; H04N 2201/0094; G05B 15/02
USPC ................................... 358/1.1–1.18
See application file for complete search history.

(56) References Cited

U.S. PATENT DOCUMENTS

| | | | |
|---|---|---|---|
| 2006/0044587 A1* | 3/2006 | Yoshida | H04N 1/00 358/1.13 |
| 2007/0201654 A1* | 8/2007 | Shenfield | G06F 9/44521 379/201.01 |
| 2012/0023451 A1 | 1/2012 | Kuroyanagi | |
| 2012/0233235 A1* | 9/2012 | Allaire | G06F 8/36 709/201 |
| 2013/0227103 A1* | 8/2013 | Garimella | H04L 41/5054 709/223 |
| 2017/0102865 A1* | 4/2017 | Ando | G06F 3/04847 |

FOREIGN PATENT DOCUMENTS

| JP | 2012-027662 A | 2/2012 |
|---|---|---|
| JP | 2012-248102 A | 12/2012 |

* cited by examiner

*Primary Examiner* — Gabriel Garcia
(74) *Attorney, Agent, or Firm* — Oliff PLC

(57) ABSTRACT

An image forming apparatus includes an application on a framework that is separated into a core logic portion handling basic processing and a user interface frame portion handling rendering processing and operates; and a controller that executes the application and the framework. The core logic portion is implemented with an application programming interface defined by the framework.

11 Claims, 11 Drawing Sheets

FIG. 8

```
applicationInfoList : [
{
    "base" :
        {
            "id" : "appId.std.copy",
            "url" : "app/copy/baseframe.html"
        },
    "apps" : [
        {
            "subId" : "copy",
            "type" : "STD",
            "appUrl" : "app/copy/copy/uiframe.html",
            "isLaunchable" : true,
            "orderWeight" : 100,
            "largeIcon" : "common/img/preset/apps/app_copy_120.png",
            "smallIcon": "common/img/preset/apps/app_copy_48.png",
            "author" : "Fuji Xerox Co.,Ltd.",
            "description" : "Standard Copy Application",
            "displayName" : "COPY",
            "displayNameId" : "001"
        },
        {
            "subId" : "idcopy",
            "type" : "STD",
            "appUrl" : "app/copy/idcopy/uiframe.html",
            "isLaunchable" : true,
            "orderWeight" : 1300,
            "largeIcon" : "common/img/preset/apps/app_idcardcopy_120.png",
            "smallIcon" : "common/img/preset/apps/app_idcardcopy_48.png",
            "author" : "Fuji Xerox Co.,Ltd.",
            "description" : "ID Card Copy Application",
            "displayName" : "IDCOPY",
            "displayNameId" : "002"
        }
    ]
}
]
```

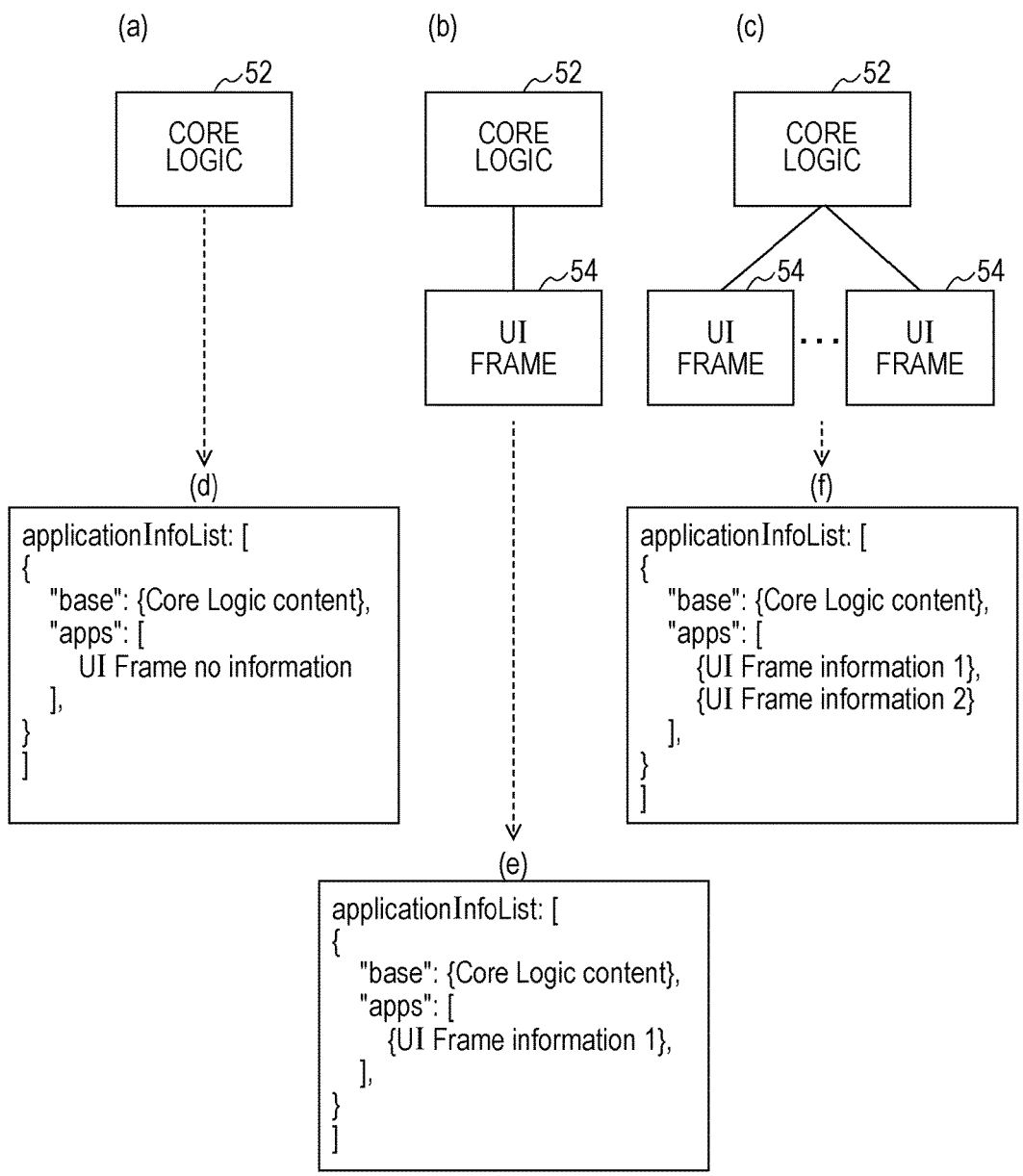

FIG. 10A

```
App/
    common/
        comlib1
        comlib2
    copy/
        baseframe.html
        base_manifest.json
        copy/
            uiframe.html
            app_manifest.json
        idcopy/
            uiframe.html
            app_manifest.json
```

FIG. 10B

```
App/
    common/
        comlib1
        comlib2
    copy/
        baseframe.html
        base_manifest.json
        copy/
            uiframe.html
            app_manifest.json
        idcopy_for_xxx
            uiframe.html
            app_manifest.json
```

FIG. 10C

```
App/
    common/
        comlib1
        comlib2
    copy_for_xxx/
        baseframe.html
        base_manifest.json
        copy/
            uiframe.html
            app_manifest.json
        idcopy
            uiframe.html
            app_manifest.json
```

IMAGE FORMING APPARATUS AND STORAGE MEDIUM INCLUDING AN APPLICATION HAVING A CORE LOGIC PORTION AND A USER INTERFACE FRAME PORTION

CROSS-REFERENCE TO RELATED APPLICATIONS

This application is based on and claims priority under 35 USC 119 from Japanese Patent Application No. 2016-187293 filed Sep. 26, 2016.

BACKGROUND

(i) Technical Field

The present invention relates to an image forming apparatus and a storage medium.

(ii) Related Art

The functions of a multifunction machine having functions, such as copy, print, and fax, are further expanded, and hence it is requested to efficiently construct the entire system including various applications.

SUMMARY

According to an aspect of the invention, there is provided an image forming apparatus including an application on a framework that is separated into a core logic portion handling basic processing and a user interface frame portion handling rendering processing and operates; and a controller that executes the application and the framework. The core logic portion is implemented with an application programming interface (API) defined by the framework.

BRIEF DESCRIPTION OF THE DRAWINGS

An exemplary embodiment of the present invention will be described in detail based on the following figures, wherein:

FIG. 8 is an explanatory view showing a specific configuration example of an application list;

FIG. 9 provides explanatory views showing patterns of core logics and UI frames;

FIGS. 10A to 10C are explanatory views at change of UI and logic;

DETAILED DESCRIPTION

An exemplary embodiment of the present invention is described below with reference to the figures.

System General Configuration

Figure 1:
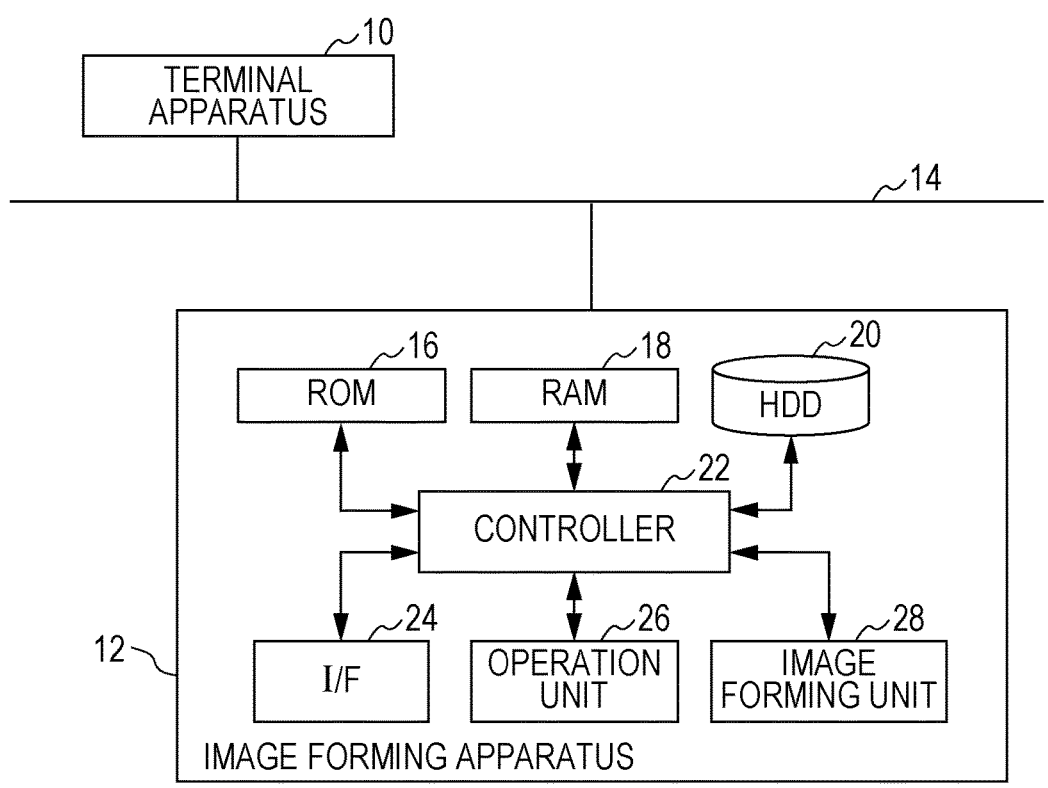
FIG. 1 is a functional block diagram of an image forming apparatus.

FIG. 1 is a configuration block diagram of an image forming system including an image forming apparatus according to this exemplary embodiment. The image forming system includes a terminal apparatus 10 and an image forming apparatus 12. The terminal apparatus 10 and the image forming apparatus 12 are connected with one another through a communication unit 14. The communication unit 14 uses, for example, a data communication network, such as a local area network (LAN).

The terminal apparatus 10 is connected with the image forming apparatus 12 through the communication unit 14, and transmits, for example, a print job including a print command of a document in accordance with an instruction of a user.

The image forming apparatus 12 includes a read-only memory (ROM) 16, a random access memory (RAM) 18, a hard disk drive (HDD) 20, a controller 22 configured of one or plural central processing units (CPUs), an input/output interface (I/F) 24, an operation unit 26 such as a touch panel, and an image forming unit 28.

The controller 22 configured of the one or plural CPUs receives, for example, a print job command from the terminal apparatus 10 through the input/output I/F 24, interprets page-description language (PDL) data and generates intermediate data, and further generates rendering data (raster data) from the generated intermediate data, in accordance with a processing program stored in the ROM 16. Also, the controller 22 executes various commands, such as copy, scan, and fax, received from the operation unit 26.

The image forming unit 28 includes a print module, a scan module, a fax module, a paper feed module, a document feed module, and an image processing accelerator.

The print module has a function of outputting an image on paper. For example, the print module includes a configuration of known inkjet method, and prints rendering data on paper. The print module discharges liquid or molten solid ink from a nozzle or the like, and executes recording on paper, film, or another material. Methods of discharging ink include a drop-on-demand method of discharging ink by using electrostatic attraction force (pressure pulse method), and a thermal inkjet method of discharging ink by using a pressure generated by forming and growing air bubbles with heat at high temperature. A recording head to be used includes, for example, a head that discharges cyan ink, a head that discharges magenta ink, a head that discharges yellow ink, and a head that discharges black ink. Each head uses a line head having at least a width equivalent to the width of paper. Ink droplets of the respective colors are discharged on an intermediate transfer body by the recording head for recording, and then transferred on paper for printing.

The scan module reads an image from paper and converts the image into electronic data.

The fax module includes a modem and a fax image processing module, and executes a fax function.

The paper feed module transports paper from a paper tray to the print module.

The document feed module transports paper from a document tray to the scan module.

The image processing accelerator is a module that executes compression/expansion processing in association with, for example, the scan module. The image processing accelerator is not necessarily provided and may be an additional module.

The image forming apparatus 12 may include, in addition to the aforementioned modules, a finisher that provides, for example, punching and sorting for paper; a universal serial bus (USB); an authentication unit that is configured of an integrated circuit (IC) card reader or the like, and authenticates a user; a billing unit; and/or a human sensor, a face camera, or the like.

Also, the image forming apparatus 12 may be connected with the Internet through the communication unit 14, or may include Ethernet (registered trademark) and/or Wi-Fi (registered trademark).

Logic Configuration of Program

Figure 2:
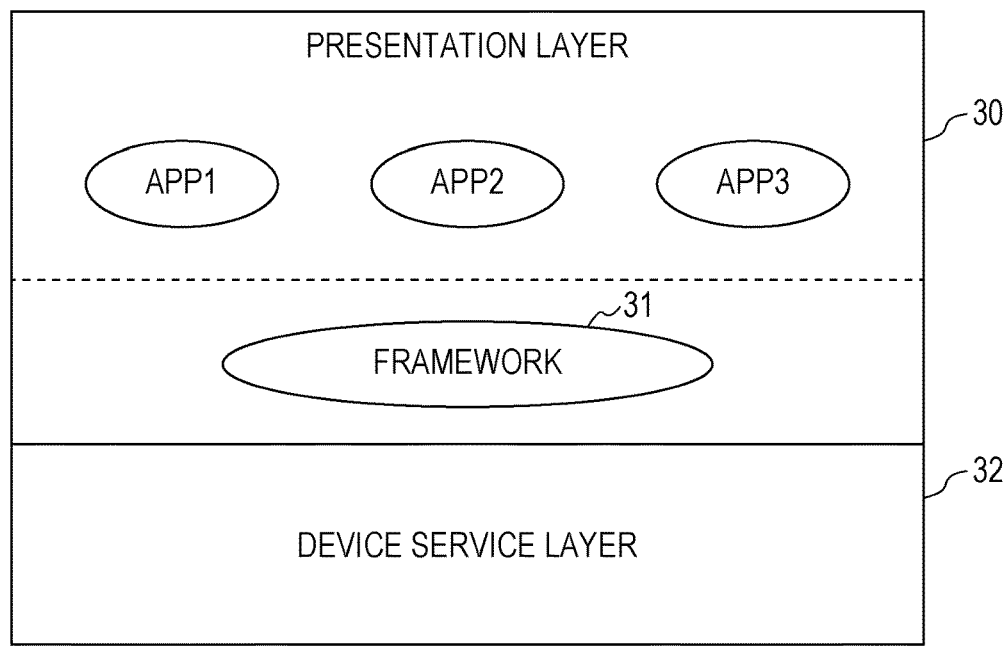
FIG. 2 is a logic configuration diagram of a system.

FIG. 2 shows a logic configuration of the system executed by the controller 22. The system is roughly separated into two layers including a presentation layer 30 and a device service layer 32.

The presentation layer 30 is a layer in which various applications are implemented, and includes a framework 31 and various applications. The framework 31 is an execution environment software group that allows JavaScript (registered trademark) applications to be operable on a computer system. To be more specific, JavaScript is executed on a web browser, and base frame and UI frame are loaded as iframe of HyperText Markup Language (HTML). Also, such an application is JavaScript software implemented with an application programming interface provided by the framework 31. The framework 31 manages the life cycles of the various applications. That is, for each of the various applications, the framework 31 creates a base frame, reads a core logic of the application, and gives an instruction of initialization to the core logic. Also, at deactivation of the system, the framework 31 gives an instruction of finalization to the core logic of each of the various applications, and deletes the base frame. The core logic and the life cycle management of each of the various applications are described later in more detail.

The device service layer 32 is a layer that manages various hardware devices. The hardware devices include, for example, the print module of the above-described image forming unit 28.

Figure 3:
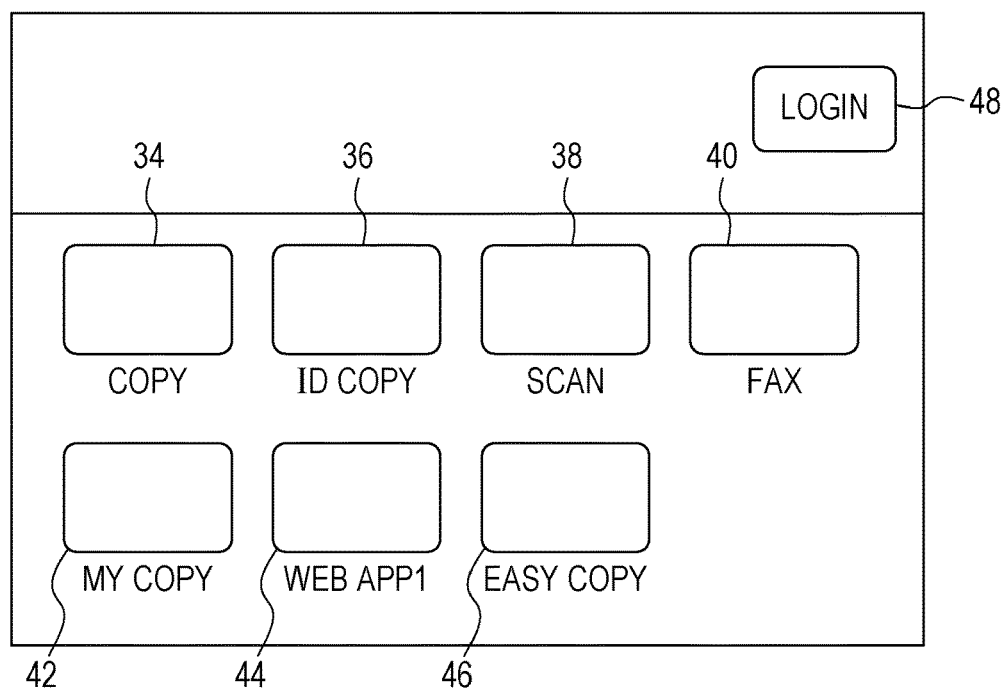
FIG. 3 is an explanatory view showing an example of a home screen.

FIG. 3 shows an example of a screen (home screen) displayed on the operation unit 26 of the image forming apparatus 12. The home screen includes icons displayed thereon. The icons include a copy button 34, an ID card copy (ID copy) button 36, a scan button 38, a fax button 40, a my copy button 42, a web application (web app1) button 44, and an easy copy button 46. When a user touches and selects one of the buttons, an application assigned to the button is activated, and the screen transitions to an application screen. The user may recognize that a button corresponds to an application.

Each application is JavaScript software implemented with the application programming interface provided by the framework 31 as described above, and is a component that provides a function directly to the user. Each application has a common configuration defined by the framework 31. Also, each application is configured to have a low link degree with respect to another application. Applications include an application that operates in cooperation with the user through a user interface (UI) and an application that does not cooperate with the user. The application that cooperates with the user subjectively executes displaying and inputting through the presentation layer 30.

The figure also shows a login button 48 for the user to make login. This button also corresponds to an application.

Implementation Structure of Application

Figure 4:
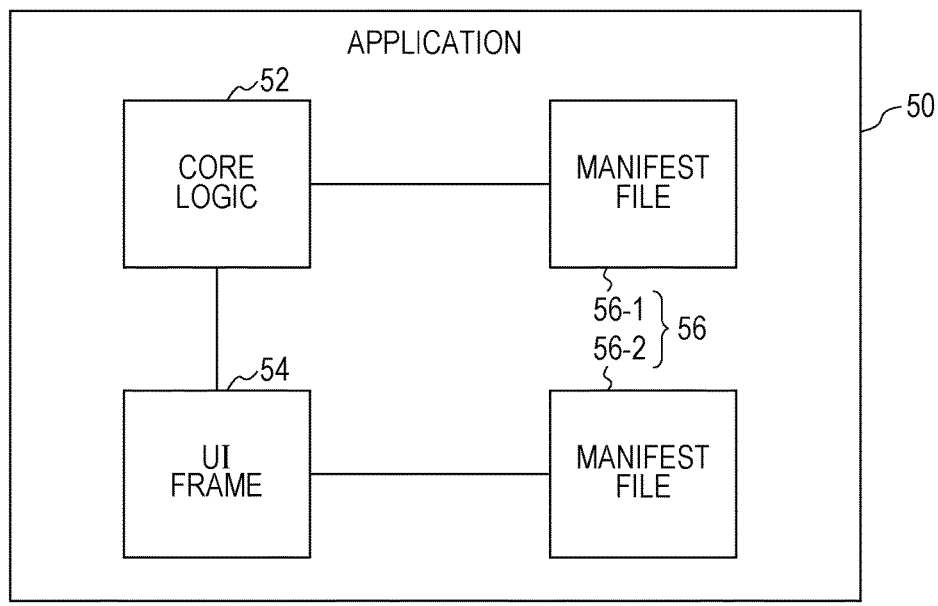
FIG. 4 is a logic configuration diagram of an application.

FIG. 4 shows a structure of an application. An application 50 is roughly separated into three components. That is, the application 50 is separated into a core logic 52, a UI frame 54, and a manifest file 56. In this case, "separation" does not represent physical separation, but represents logical separation.

The core logic 52 is a component that executes basic processing (basic behavior and inter-application association) as an application, and is necessarily present in each application. The core logic provides an application programming interface defined by the framework 31.

The UI frame 54 is a component that provides rendering and displaying as an application, or more specifically, is managed as a display window.

The manifest file 56 is a list of passive information on each application. The passive information may include an identifier (ID), a display name, an icon image, a version, a creation date, and so forth, of the application. The manifest file 56 includes a core logic manifest file 56-1 and a UI frame manifest file 56-2. A piece of information to be written by the manifest file 56 is isLaunchable attribute. With this attribute, it is determined whether or not the application is displayed as an icon (button) on the home screen. The attributes are as follows:

display is selected if isLaunchable=true; and
non-display is selected if isLaunchable=false.

With this configuration, communication rules between the core logic 52 and the UI frame 54 are as follows:
(1) the core logic 52 communicates with another core logic 52; and
(2) the UI frame 54 communicates with only the core logic 52.

Therefore, the UI frame 54 does not communicate with another UI frame 54.

Figure 5:
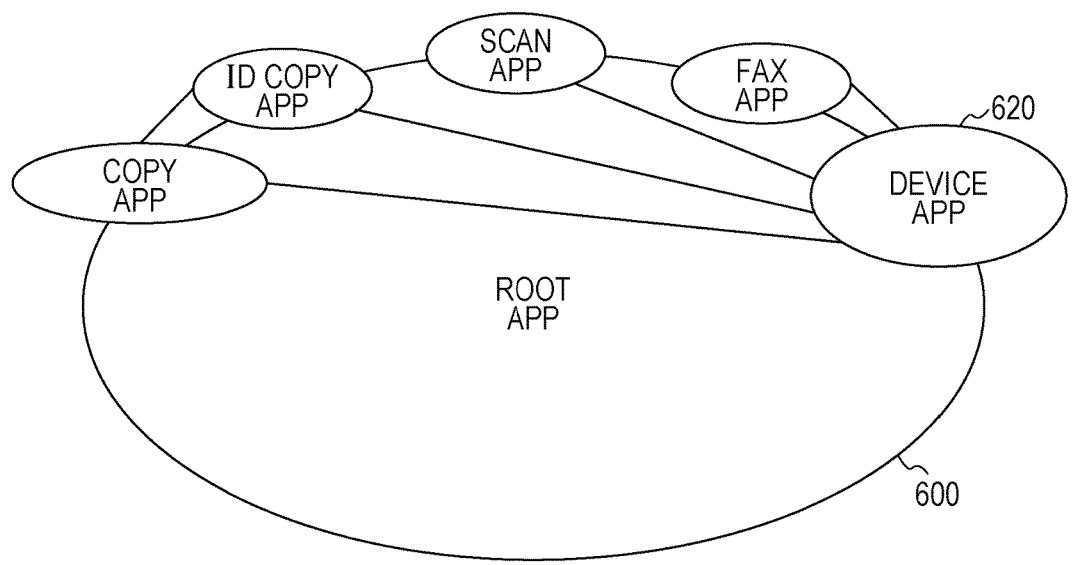
FIG. 5 is a logic configuration diagram of a system of related art.

FIG. 5 shows a program configuration of related art. In related art, a large root application (root app) 600 is prepared and various functions to be used by respective applications are provided. All the applications depend on this root application 600. Also, a device application (device app) 620 that dedicatedly handles the states of various devices is also independently present. Substantially all the applications depend on this device application 620. Further, common implementation among applications progresses, and the applications depend on one another. Hence, even in a case where an application is added or deleted, adjustment is required among the applications every time the case occurs, and the root application 600 is constantly required to be corrected. An application may not be easily added or deleted.

Figure 6:
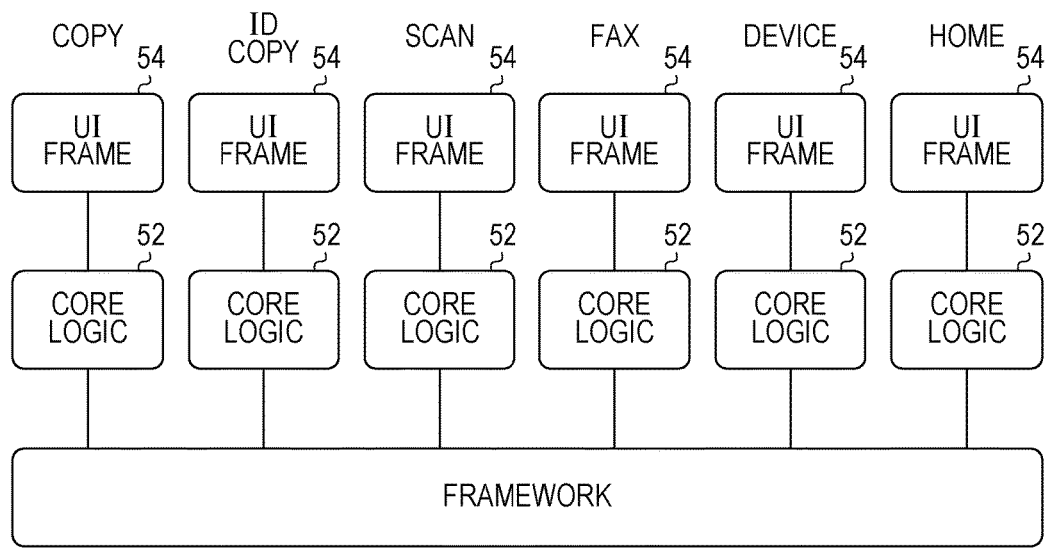
FIG. 6 is a configuration diagram of applications on a framework.

In contrast, FIG. 6 shows a program configuration of this exemplary embodiment. Each application is separated into a core logic 52, a UI frame 54, and a manifest file 56. The core logic 52 of each application is connected with a framework 31. The UI frame 54 of each application is connected with the core logic 52 of the application.

For example, exemplarily describing a copy application, the copy application is separated into a core logic 52, a UI frame 54, and a manifest file 56. The core logic 52 is connected with the framework 31. The UI frame 54 is connected with the core logic 52. Link among respective applications is limited without dependence unlike related art, and hence association among the applications is executed by the framework 31 through the core logics 52. The core logic 52 of each application provides an application programming interface defined by the framework 31. Hence, when an application is newly added, the addition may be easily executed by providing the application programming interface defined by the framework 31. Also, since the link among the applications is limited, an application may be easily deleted.

Figure 7:
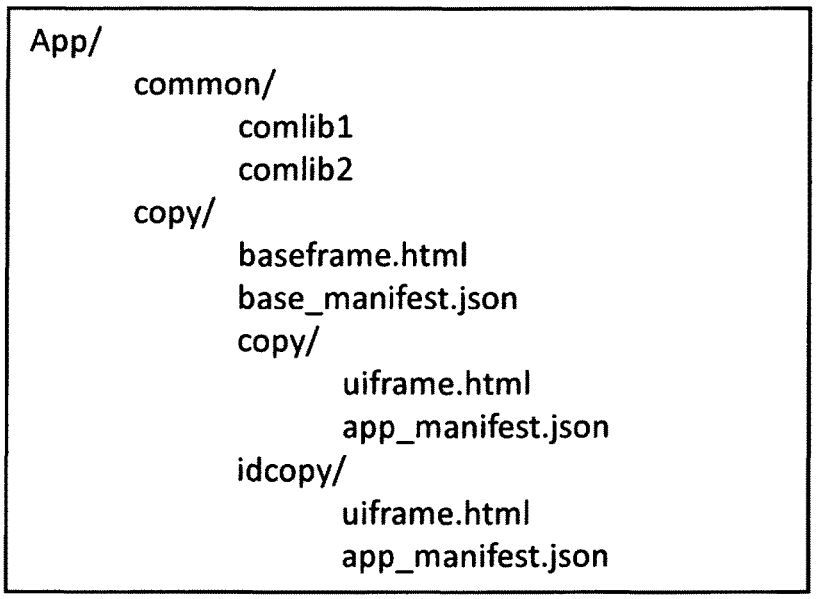
FIG. 7 is an explanatory view showing a specific configuration example of an application.

FIG. 7 shows an example of the copy application. In the figure, baseframe.html is a core logic 52, and base_manifest.json is a manifest file 56-1 of the core logic 52. Also, uiframe.html is a UI frame 54, and app_manifest.json is a manifest file 56-2 of the UI frame 54.

FIG. 8 shows an example of an application list. In the figure, "base" represents a manifest file 56-1 of a core logic 52, and "app" represents a manifest file 56-2 of a UI frame 54. In the manifest file 56-2, "type" represents the type of an application. The types of applications are as follows.

In particular, applications include four types.
STD: an application preinstalled
OT: a shortcut of the application preinstalled (STD)
EXT: an application that may be added (type I application)
CS: an application that may be added (type II application)
Applications preinstalled are applications corresponding to copy, scan, fax, and so forth, shown in FIG. 3. Also, each application of OT, EXT, and CS is assigned with a special companion application. Each companion application handles a corresponding function. Each companion application also includes a core logic 52 similarly to the STD application. Since the manifest file 56 includes the type of an application, the internal implementation of each application may be discriminated from that of another application.

Also, "isLaunchable" in the manifest file 56-2 is attribute information that determines whether or not an icon is displayed on the home screen as described above. In the figure, the display is as follows.
isLaunchable=true
This represents that the copy button is displayed.

Since the application is separated into the core logic 52 and the UI frame 54, the application list describes the correspondence therebetween.

The manifest file 56 is created for each application. Hence, it is desirable to set an identifier representing the type of each application and a unique identifier in the type. For example, the manifest file of the copy application has identifiers as follows.
type:STD
ID:copy
In these identifiers, type is an identifier representing a type (an application preinstalled), and ID is a unique identifier.

Further, the manifest file 56 includes information required at activation and information required for rendering the home screen as static information. The information required at activation is storage location information on the core logic 52 and storage location information on the UI frame 54. The framework 31 loads the core logic 52 with reference to the storage location information on the core logic 52. Also, the core logic 52 loads the UI frame 54 if required with reference to the storage location information on the UI frame 54.

The information required for rendering the home screen is storage location information on icon buttons and the display order of the buttons.

The manifest file 56 is referenced by an application management component in the device service layer and is used for creating an application list (described later).

FIG. 9 shows patterns of implementation structures of applications.

Part (a) in FIG. 9 meets a pattern in which a core logic 52 is present but a UI frame 54 is not present. This does not correspond to an application preinstalled but corresponds to, for example, a companion application. Part (d) in FIG. 9 is an application list corresponding to part (a) in FIG. 9.

Part (b) in FIG. 9 meets a pattern in which a core logic 52 and a UI frame 54 are present by one-to-one correspondence. Part (e) in FIG. 9 is an application list corresponding to part (b) in FIG. 9.

In contrast, part (c) in FIG. 9 shows a case where a core logic 52 and plural UI frames 54 are present, and the plural UI frames 54 share the common core logic 52. A UI frame 54 determines a display style when a button is displayed on the home screen. Even when plural buttons are displayed, by sharing the common core logic 52, efficiency of implementation is increased. Also, if plural applications share the common core logic 52, performance of maintenance is increased. The number of UI frames 54 sharing the common core logic 52 is not limited. Part (f) in FIG. 9 is an application list corresponding to part (c) in FIG. 9. A specific example of a manifest file 56-1 is, for example, as follows.

```
{
    "id": "appId.std.copy",
    "url": "app/copy/baseframe/baseframe.html"
}
```

A specific example of a manifest file 56-2 is, for example, as follows.

```
{
    "subId": "copy",
    "type": "STD",
    "appUrl": "app/copy/copy/uiframe.html",
    "isLaunchable": true,
    "orderWeight": 100,
    "largeIcon":
 "common/img/preset/app/app_copy_120.png",
    "smallIcon": "common/img/preset/app/app_copy_48.png",
    "displayName": "Copy",
    "displayNameId": "001"
}
```

Another example is as follows.

```
{
    "subId": "idcopy",
    "type": "STD",
    "appUrl": "app/copy/idcopy/uiframe.html",
    "isLaunchable": true,
    "orderWeight": 900,
    "largeIcon":
 "common/img/preset/app/app_idcardcopy_120.png",
    "smallIcon":
 "common/img/preset/app/app_idcardcopy_48.png",
    "displayName": "IDCardCopy",
    "displayNameId": "002"
}
```

In part (b) in FIG. 9 and part (c) in FIG. 9, by setting the isLaunchable attribute value of the manifest file 56-2 of the UI frame 54, it is determined whether or not a button is actually displayed on the home screen. For example, in part (c) in FIG. 9, in the case where the first UI frame 54 and the second UI frame 54 sharing the common core logic 52 are present, the manifest file of the first UI frame 54 is isLaunchable=true, and the manifest file of the second UI frame 54 is isLaunchable=false, the former one is displayed as a button but the later one is not displayed.

As an execution structure of an application, a core logic 52 is separated from a UI frame 54. Hence, only the UI frame 54 may be changed without changing the core logic 52, and the display style on the screen of an application may be easily customized.

FIGS. 10A to 10C each show an example of customizing the display style on the screen.

FIG. 10A is an initial display style. Focusing on an application of ID card copy, its UI frame 54 is idcopy/uiframe.html, and its manifest file 56-2 is idcopy/app_manifest.json.

FIG. 10B is a case where the display style is customized. In the application of ID copy, the UI frame 54 and the manifest file 56-2 are replaced with idcopy_for_xxx/uiframe.html and idcopy_for_xxx/app_manifest.json for a new display style. Of course, only the manifest file 56-2 may be replaced.

In contrast, FIG. 10C shows a case where not the display style but the logic of the application is changed. In this case, all the core logic 52, the UI frame 54, and the manifest file 56 are replaced with new components. That is, the part indicated by copy/is replaced with copy_for_xxx/.

Figure 11A:
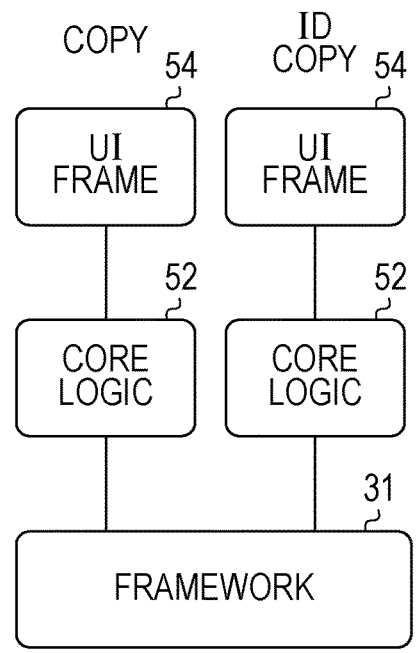
FIGS. 11A and 11B are explanatory views each showing a pattern of applications on a framework.
Figure 11B:
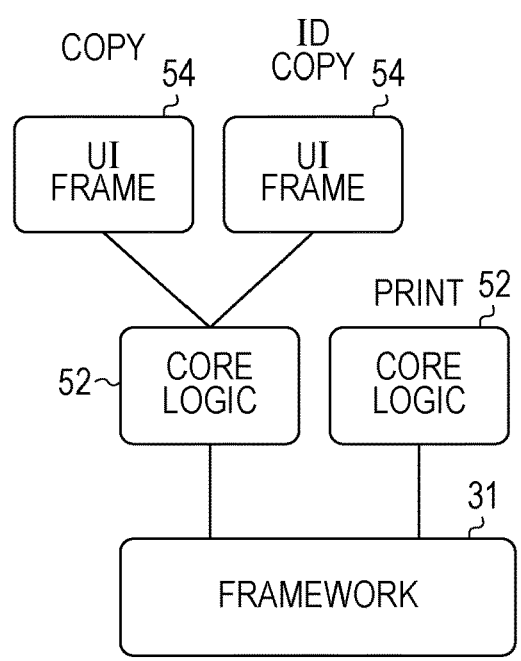

FIGS. 11A and 11B each show a pattern of an implementation structure of specific applications including a framework 31.

FIG. 11A shows an example of a pattern in a case where the copy application and the ID copy application are implemented. The copy application is separated into a core logic 52 and a UI frame 54. The core logic 52 communicates with a framework 31. The UI frame 54 communicates with only the core logic 52. Similarly, the ID copy application is separated into a core logic 52 and a UI frame 54. The core logic 52 communicates with the framework 31. The UI frame 54 communicates with only the core logic 52.

FIG. 11B shows another example in a case where a print application is implemented in addition to the copy application and the ID copy application. The copy application and the ID copy application are separated into a common core logic 52 and respective UI frames 54. That is, the copy application and the ID copy application communicate with a framework 31 through the common core logic 52. Also, the print application has a core logic 52, but does not have a UI frame 54. FIGS. 11A and 11B include all patterns shown in FIG. 9.

In an application implementation structure of related art, a core logic 52 and a UI frame 54 are not separated from one another unlike the aforementioned structure, and processing and screen rendering are mixed, resulting in a complicated structure. Also, a common programming interface of applications is not present, and each application freely publicizes a programming interface and freely references the programming interface. In contrast, in this exemplary embodiment, the framework 31 defines an application programming interface, and the core logic 52 of each application is necessarily implemented with the application programming interface. Hence, the direction of the application programming interface in this exemplary embodiment differs from that of related art. Also, in addition to communication between the framework 31 and each of applications, a communication programming interface among the applications may be realized by a programming interface publicization function and an application programming interface reference function provided by the framework 31.

In theory, plural applications may share a common UI frame 54 and may respectively have individual core logics 52. However, in this case, the structure may be complicated in the viewpoint of the framework 31, and hence this case is not particularly described in this exemplary embodiment. Of course, it is not necessarily intended to exclude this pattern.

Life Cycle Management for Application

Figure 12:
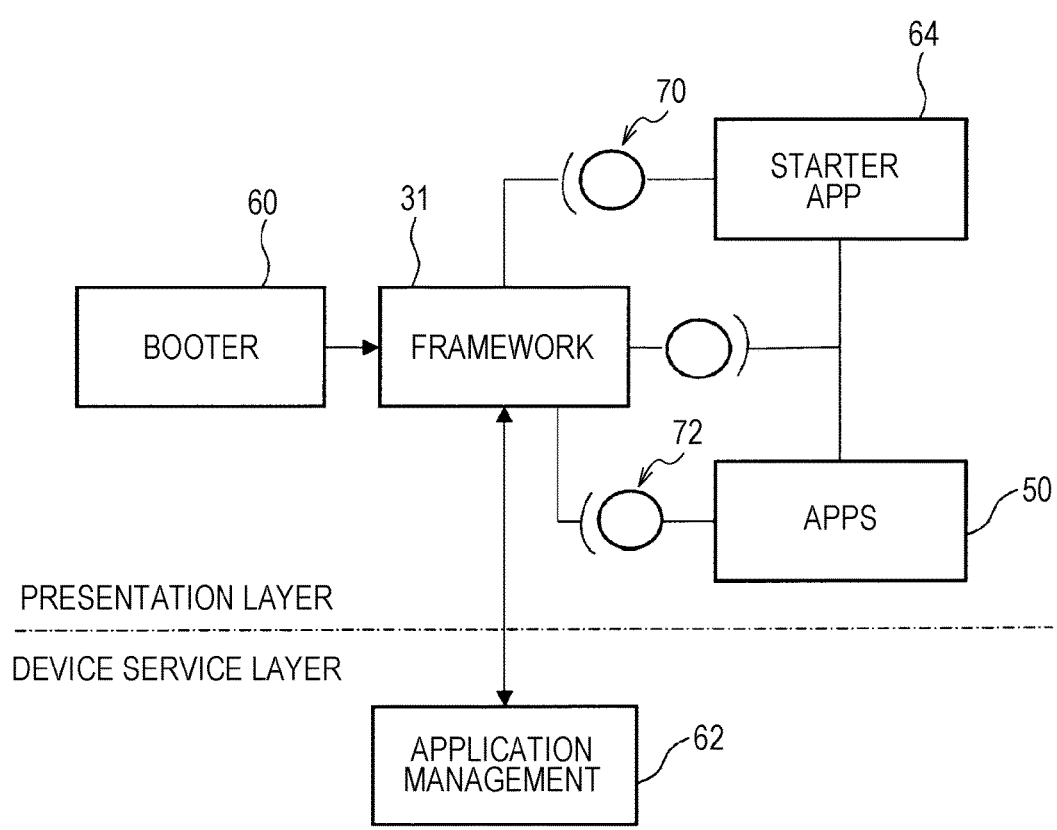
FIG. 12 is a system configuration diagram of life cycle management including a booter and a starter.

FIG. 12 shows a basic configuration when a framework 31 executes life cycle management for each application. In this case, the framework 31 is an execution environment of applications.

A framework 31 and various applications 50, and in addition, a booter 60 and a starter application 64 are present in the presentation layer. Also, an application management component 62 is present in the device service layer.

The booter 60 is a component that executes activation/deactivation management of the entire presentation layer. The framework 31 is initialized and activated by the booter 60.

The application management component 62 provides an application list to the framework 31 on the basis of manifest files 56 of the various applications 50.

The starter application 64 is an application that is implemented with a starter programming interface 70 defined by the framework 31. The starter application 64 is only one application present in the system, and is called from the framework 31 when initialization of all the applications 50 is completed.

The various applications 50 include the copy application, ID copy application, fax application, and so forth, and include core logics 52 as described above. The core logics 52 of the various applications 50 each are implemented with an application programming interface 72 defined by the framework 31.

Specifically, the application programming interface implemented in each application 50 is as follows.

Initialization processing (initialize)
Finalization processing (finalize)
Window pushed out processing (windowPushedOut)
Window prepare exposed processing (windowPrepareExposed)
Window prepare terminated processing (windowPrepareTerminated)

Each application 50 is implemented with a handler for these events.

The framework 31 includes a JavaScript component (referred to as communication control component) for enabling publicization/call of a method, and publicization/purchase/issue of an event among the core logics 52 of the various applications 50. A method may be defined to take a desirable parameter and to return a desirable return value. The publicized method is independently managed on an application basis. The application that calls the method may check completion of processing of the method by callback. Also, an event may be defined by each application with desirable data. The publicized event is independently managed on an application basis. To be more specific, the communication control component enables publicization and call of a method by the core logic 52, enables definition and issue of an event and registration of a listener, publicizes the method by "ON," and stops the publicization of the method by "OFF." The publicized method is able to be called by call. For example, the first application sets a certain application programming interface "on" for publicization to the framework 31, and the second application makes "call" for the publicized programming interface of the first application to the framework 31.

Figure 13:
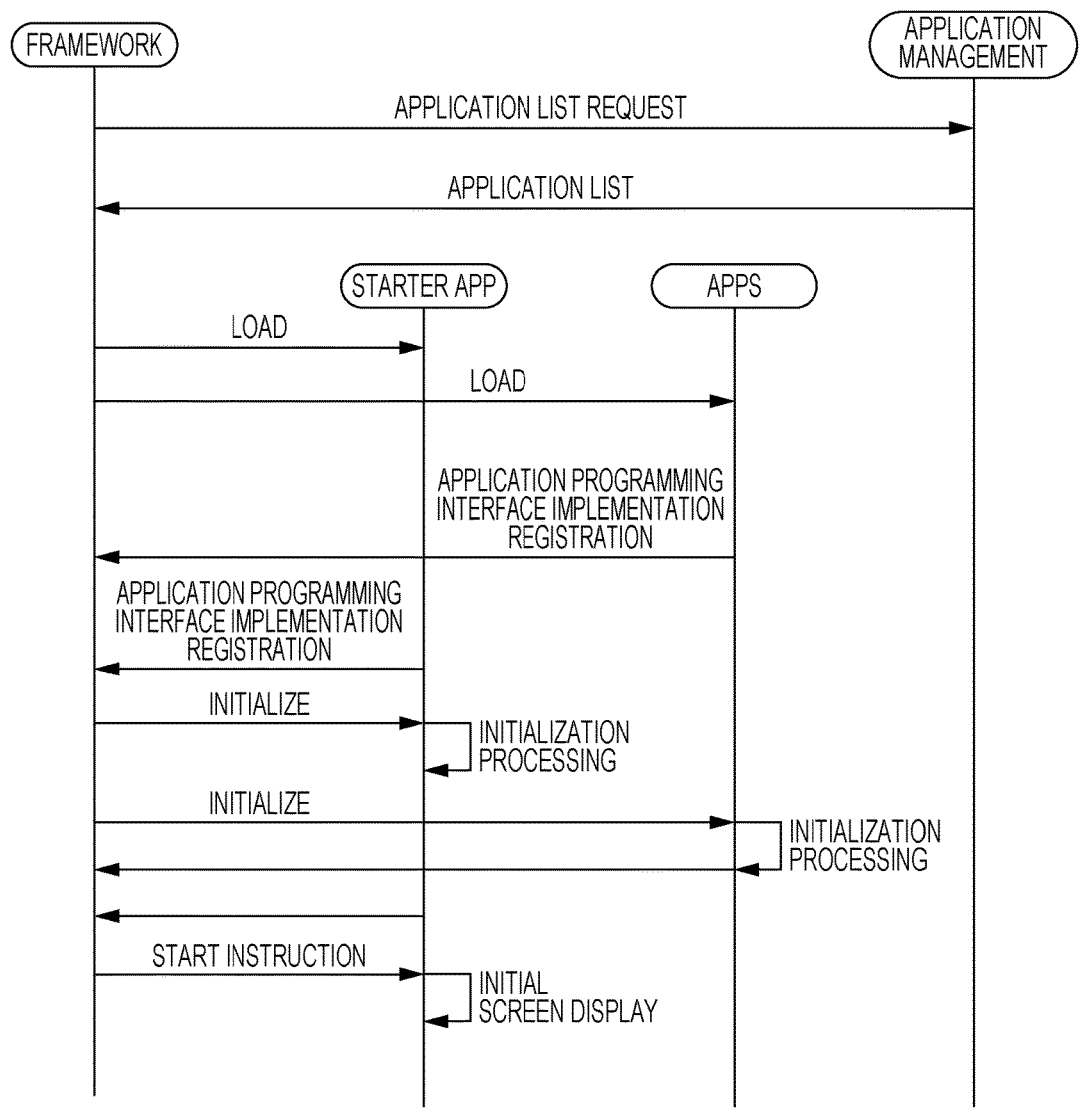
FIG. 13 is a sequence diagram of the life cycle management.

FIG. 13 is a sequence diagram of life cycle management for each of the various applications by the framework 31.

When the booter 60 activates the framework 31, the framework 31 requests an application list from the application management component 62 in the device service layer, and acquires the application list from the application management component 62.

When the framework 31 acquires the application list, the framework 31 creates a base frame on an application basis according to the list, and loads the various applications 50 including the starter application 64 (load phase). That is, the framework 31 reads the core logic 52 of each application. To be specific, the framework 31 loads the core logic 52 with reference to storage location information on the core logic 52 defined in the manifest file 56. The base frame is a frame for executing the core logic 52 of each application, and this frame is not displayed. The load order of the core logics 52 of the respective applications is desirably determined and the order is not particularly limited. This phase goes to the next phase at a time point at which all the applications have completed registration of application programming interface implementation.

It is to be noted that the method and event of each application are publicized before the registration processing of the application programming interface implementation.

Next, the framework 31 gives an instruction of initialization to each application through the application programming interface (initialize phase). To be specific, the framework 31 issues "app" event and "initialize" method to each application. At a time point at which all the applications callback after the process completion in response to the initialization instruction, the framework 31 notifies the booter 60 about the completion of the initialization processing, and the phase goes to the next phase. The order of initialization of the respective applications may be also desirably determined. In this initialization processing, each application executes data acquisition from the device service layer.

Then, the booter 60 gives a start instruction for provision of a function by an application to the framework 31, and the framework 31 gives a start instruction to the starter application 64 in response to the given instruction (start phase). The starter application 64 acquires information on an initial activation application managed in the device service layer, and displays an initial screen. This phase is completed at a time point at which the starter application 64 callbacks after the process completion in response to the start instruction.

At deactivation of the system, the framework 31 gives an instruction of finalization to the core logic 52 of each application. Also, the framework 31 deletes the base frame of each application.

In the load phase, the core logics 52 of the respective applications are read without a particularly limited order. Hence, even when an application is added, the load phase does not have to be changed. Also, in the initialize phase, all the applications are initialized. Hence, the other applications are assuredly called, and individual synchronization is not required. As described above, since the synchronization among the applications is no longer required and only the core logics 52 with relatively small sizes are loaded, the system activation time and the application activation time are reduced.

If each application independently publicizes an application programming interface, activation, pre-initialization processing, initialization processing, post-initialization processing, stop, temporary stop, and so forth, are different on an application basis. A difference is generated in initialization level of each application, and the timing at which the application is able to be called also varies. In particular, it is required to check whether or not a subject application is able to be called before the application is called. The control may be complicated. In contrast, in the exemplary embodiment, the initialization time may be reduced as described above, and the activation time of the home screen after the initialization may be reduced.

Figure 14:
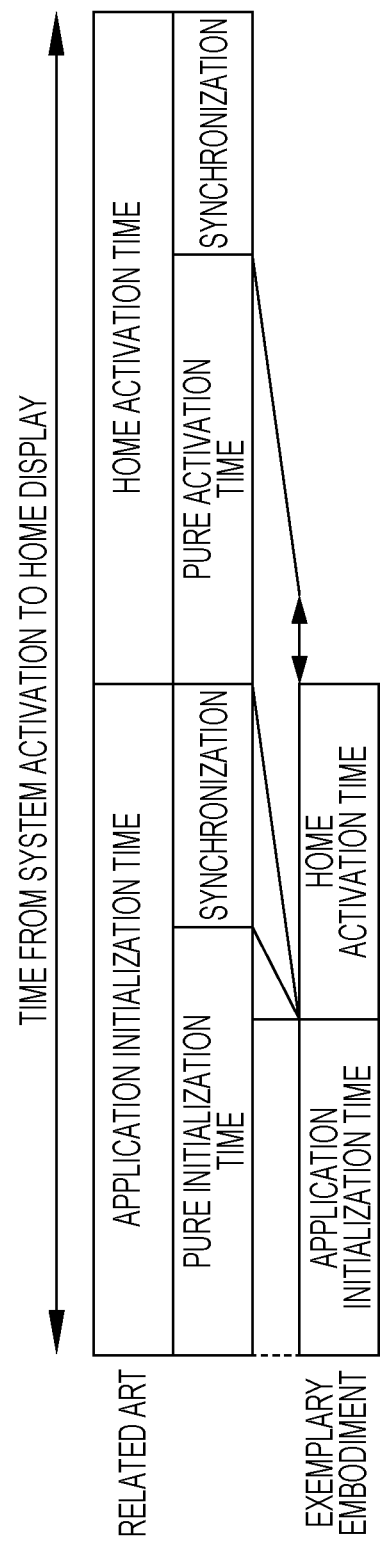
FIG. 14 is a graph showing time from system activation to home screen display.

FIG. 14 shows the time from system activation to home screen display according to related art and the exemplary embodiment.

In related art, the application initialization time requires synchronization in addition to pure initialization time, and the activation time of the home screen requires synchronization in addition to pure activation time similarly. In contrast, in this exemplary embodiment, the pure initialization time may be reduced, and the synchronization may be eliminated. Also, for the home activation time, similar effect may be provided. In related art, if applications depend on one another, adjustment is required to prevent deadlock from being generated. However, in this exemplary embodiment, such dependence is not present, and hence deadlock adjustment is no longer required.

As described above, in this exemplary embodiment, an application is separated into a core logic 52 and a UI frame 54, an application programming interface defined by a framework 31 is implemented in the core logic 52, the core logic 52 communicates with a core logic 52 of another application through the framework 31, and the UI frame 54 communicates with only the core logic 52 of the application. Accordingly, each application has a common configuration defined by the framework 31, and may be configured to have a low link degree with another application. An application may be easily added or deleted.

A "component" in this exemplary embodiment represents a component of software that may be logically separated. A component may be executed by one or plural processors. In this exemplary embodiment, JavaScript is used. However, of course, any one of other programming languages may be used.

Also, the present invention is not limited to the above-described exemplary embodiment, and may be modified in various ways. Modifications are described below.

Modifications

In the exemplary embodiment, the controller (processor) 22 of the image forming apparatus 12 executes the framework 31 and the various applications 50 in the presentation layer 30. However, since the presentation layer 30 and the device service layer 32 are separated from one another as shown in FIG. 2, an individual apparatus different from the image forming apparatus 12, for example, a processor in a mobile terminal, such as a smart phone or a tablet terminal, for controlling the image forming apparatus 12 may execute the framework 31 and the various applications 50 in the presentation layer 30. Also, the operation unit 26 in FIG. 1 is desirably mounted on the mobile terminal. In this case, the mobile terminal and the image forming apparatus 12 may be collectively called image forming apparatus or image forming system.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an application on a framework that is separated into a core logic portion handling basic processing and a user interface frame portion handling rendering processing and operations; and
   a controller that executes the application and the framework,
   wherein the core logic portion is implemented with an application programming interface defined by the framework, and
   the user interface frame portion is configured to only communicate with the core logic portion and not communicate with another user interface portion of another application.

2. The image forming apparatus according to claim 1, wherein the application is separated into the core logic portion, the user interface frame portion, and a manifest file that defines static information.

3. The image forming apparatus according to claim 2, wherein the static information includes attribute information for displaying an icon of the application on a screen.

4. The image forming apparatus according to claim 1, wherein the application includes a first application having a core logic portion, and a second application having a core logic portion and a user interface frame portion.

5. The image forming apparatus according to claim 1, wherein the application includes an application having a common core logic portion that is common to the application and another application.

6. The image forming apparatus according to claim 1, wherein the application includes a plurality of applications, and the framework loads all core logic portions of the plurality of applications at activation of a system.

7. The image forming apparatus according to claim 6, wherein the framework executes initialization processing for all the applications after the framework loads all the core logic portions of the plurality of applications.

8. The image forming apparatus according to claim 6, wherein the loading of all the core logic portions is executed in an order that is not particularly limited.

9. The image forming apparatus according to claim 7, wherein the initialization processing for all the applications is executed in an order that is not particularly limited.

10. A non-transitory computer readable medium storing a program causing a processor that controls an image forming apparatus to execute a process for image formation, the process comprising:
    separating an application into a core logic portion handling basic processing and a user interface frame portion handling rendering processing, implementing an application programming interface defined by a framework in the core logic portion, and loading the core logic portion by the framework at activation of a system, wherein the user interface frame portion is configured to only communicate with the core logic portion and not communicate with another user interface portion of another application.

11. The medium according to claim 10,
    wherein the application is separated into the core logic portion, the user interface frame portion, and a manifest file that defines static information.

* * * * *